United States Patent
Wang et al.

(10) Patent No.: US 11,277,719 B2
(45) Date of Patent: *Mar. 15, 2022

(54) BAND USAGE INFORMATION GENERATING AND REPORTING METHOD, CHARGING METHOD, ENODEB, AND MME

(71) Applicant: Panasonic Intellectual Property Corporation of America, Torrance, CA (US)

(72) Inventors: Li Wang, Beijing (CN); Hidetoshi Suzuki, Kanagawa (JP); Prateek Basu Mallick, Hessen (DE); Lilei Wang, Beijing (CN); Jens Bachmann, Hessen (DE); Takako Hori, Kanagawa (JP); Masayuki Hoshino, Kanagawa (JP); Chi Gao, Beijing (CN); Michael Einhaus, Hessen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/114,119

(22) Filed: Dec. 7, 2020

(65) Prior Publication Data

US 2021/0092569 A1  Mar. 25, 2021

Related U.S. Application Data

(63) Continuation of application No. 16/581,030, filed on Sep. 24, 2019, now Pat. No. 10,893,396, which is a
(Continued)

(51) Int. Cl.
*H04W 4/24* (2018.01)
*H04L 12/14* (2006.01)
(Continued)

(52) U.S. Cl.
CPC ........... *H04W 4/24* (2013.01); *H04L 12/1407* (2013.01); *H04L 12/1435* (2013.01);
(Continued)

(58) Field of Classification Search
CPC ......... H04W 4/24; H04W 4/26; H04W 24/10; H04W 84/042; H04M 15/58;
(Continued)

(56) References Cited

U.S. PATENT DOCUMENTS 8,566,455 B1   10/2013   Zhao et al.
8,934,331 B2 *  1/2015   Song ................. H04W 36/0022
                                          370/216
(Continued)

FOREIGN PATENT DOCUMENTS

CN       103249078 A    8/2013
JP       2015-167313 A  9/2015
(Continued)

OTHER PUBLICATIONS

3GPP TS 32.240 V14.0.0, "3rd Generation Partnership Project; Technical Specification Group Services and System Aspects; Telecommunication management; Charging management; Charging architecture and principles (Release 14)," Jun. 2016, 54 pages.
(Continued)

*Primary Examiner* — Minjung Kim
(74) *Attorney, Agent, or Firm* — Seed IP Law Group LLP

(57) ABSTRACT

The present disclosure provides a band usage information generating and reporting method, a charging method, an eNB, a CN, a MME and a UE. The eNB and the UE can generate band usage information for charging, and report the band usage information to the CN, wherein the band usage information involves band usage of at least a first band and a second band, and traffic is assigned to respective bands by the eNB. The Counting entity at the eNB or UE can count
(Continued)

```
┌─────────────────────────────────────────┐
│   GENERATING BAND USAGE INFORMATION     │──S301
│            FOR CHARGING                 │
└─────────────────────────────────────────┘
                    │
                    ▼
┌─────────────────────────────────────────┐
│     REPORTING THE BAND USAGE            │──S302
│       INFORMATION TO A CN               │
└─────────────────────────────────────────┘
``` the data volume of each band or ratio of data volume via different bands as the band usage information based on the scheduling information of the data. The Charging system located in the CN can process the charging and generate a bill according to the reported band usage information.

11 Claims, 6 Drawing Sheets

Related U.S. Application Data continuation of application No. 15/434,773, filed on Feb. 16, 2017, now Pat. No. 10,536,824, which is a continuation of application No. PCT/CN2014/086059, filed on Sep. 5, 2014.

(51) Int. Cl.
  *H04M 15/00* (2006.01)
  *H04L 12/26* (2006.01)
  *H04W 24/10* (2009.01)
  *H04L 43/065* (2022.01)
  *H04L 43/0894* (2022.01)
  *H04W 84/04* (2009.01)

(52) U.S. Cl.
  CPC ........ *H04L 43/065* (2013.01); *H04L 43/0894* (2013.01); *H04M 15/00* (2013.01); *H04M 15/58* (2013.01); *H04M 15/66* (2013.01); *H04W 24/10* (2013.01); *H04L 12/1467* (2013.01); *H04W 84/042* (2013.01)

(58) Field of Classification Search
  CPC ............... H04L 43/0894; H04L 43/065; H04L 12/1435; H04L 12/1407; H04L 12/1467
  See application file for complete search history.

(56) References Cited

U.S. PATENT DOCUMENTS

| | | | |
|---|---|---|---|
| 2002/0114280 A1 | 8/2002 | Yi et al. | |
| 2008/0123655 A1* | 5/2008 | Kim | H04L 1/1867 370/394 |
| 2008/0163309 A1 | 7/2008 | Kauranen | |
| 2009/0268635 A1* | 10/2009 | Gallagher | H04W 8/08 370/254 |
| 2011/0319115 A1* | 12/2011 | Racz | H04W 24/10 455/514 |
| 2012/0064858 A1 | 3/2012 | Cai et al. | |
| 2012/0094681 A1* | 4/2012 | Freda | H04W 72/02 455/452.1 |
| 2012/0281564 A1 | 11/2012 | Zhang et al. | |
| 2013/0242859 A1* | 9/2013 | Celik | H04L 1/1841 370/328 |
| 2014/0321288 A1* | 10/2014 | Ha | H04W 28/0268 370/237 |
| 2015/0133081 A1* | 5/2015 | Griot | H04L 12/1435 455/407 |
| 2016/0234714 A1* | 8/2016 | Basu Mallick | H04W 28/0278 |

FOREIGN PATENT DOCUMENTS

| | | | | |
|---|---|---|---|---|
| JP | 2016-540427 A | 12/2016 | | |
| WO | 2013/113387 A1 | 8/2013 | | |
| WO | WO-2013113387 A1 * | 8/2013 | ........ | H04W 72/0453 |
| WO | 2014/130446 A1 | 8/2014 | | |
| WO | 2015/073130 A1 | 5/2015 | | |

OTHER PUBLICATIONS

3GPP TS 32.422 V12.2.0, "3rd Generation Partnership Project; Technical Specification Group Services and System Aspects; Telecommunication management; Subscriber and equipment trace; Trace control and configuration management (Release 12)," Jun. 2014, 136 pages.

3GPP TS 33.401 V12.11.0, "3rd Generation Partnership Project; Technical Specification Group Services and System Aspects; 3GPP System Architecture Evolution (SAE); Security architecture (Release 12)," Jun. 2014, 137 pages.

3GPP TS 36.413 V12.2.0, "3rd Generation Partnership Project; Technical Specification Group Radio Access Network; Evolved Universal Terrestrial Radio Access Network (E-UTRAN); S1 Application Protocol (S1AP) (Release 12)," Jun. 2014, 285 pages.

"3rd Generation Partnership Project; Technical Specification Group Core Network and Terminals; Policy and Charging Control (PCC); Reference points (Release 12)", 3GPP Standard; 3GPP TS 29.212, 3rd Generation Partnership Project (3GPP), Mobile Competence Centre; 650, Route Des Lucioles; F-06921 Sophia-Antipolis Cedex; France, vol. CT WG3, No. V12.5.2, Jul. 2, 2014 (Jul. 2, 2014), pp. 1-222, XP050774530, [retrieved on Jul. 2, 2014].

Communication pursuant to Article 94(3) EPC dated Apr. 16, 2019 for the related European Patent Application No. 14901214.8.

International Search Report of PCT application No. PCT/CN2014/086059 dated Apr. 29, 2015.

Extended European Search Report, dated Jul. 20, 2017, for European Application No. 14901214.8-1862 / 3189680, 11 pages.

English Translation of Chinese Office Action dated Jan. 6, 2021 for the related Chinese Patent Application No. 202010254367.1, 11 pages.

* cited by examiner

BAND USAGE INFORMATION GENERATING AND REPORTING METHOD, CHARGING METHOD, ENODEB, AND MME

BACKGROUND

1. Technical Field

The present disclosure relates to the field of charging for wireless communication, and in particular, to a band usage information generating and reporting method, a charging method, an eNodeB (eNB), a core network (CN), a Mobility Management Entity (MME) and a user equipment (UE).

2. Description of the Related Art

Rapid growth of mobile data forces operators to utilize the finite frequency spectrum with higher and higher efficiency, while plenty of unlicensed frequency spectra are utilized less efficiently only by WiFi, Bluetooth, etc. LTE-U (LTE-unlicensed) could extend the LTE spectrum to unlicensed band that would augment the network capacity directly and dramatically. LTE-U with LAA (Licensed Assisted Access) has higher spectrum efficiency than WiFi especially when there are massive users due to for example reliable CCH (Control CHannel), LA (Link Adaption), HARQ (Hybrid Automatic Repeat Request), ICIC (Inter Cell Interference Coordination), interference cancellation. LTE-U could well co-exist with the existed RATs (Radio Access Technologies) by following mechanism, e.g. LBT (Listen Before Talk), DFS (Dynamic Frequency Selection), TPC (Transmit Power Control). Network architecture will be more simple and unified.

In the scope of LTE-U, there are mainly two types of offloading as follows.
1) CN (Core Network) offloading: different services via different bearers, e.g. one bearer for WiFi (or LTE unlicensed frequency) and another bearer for LTE licensed frequency. Currently, UE (User Equipment) will automatically or manually switch to a WiFi network if the WiFi network is available no matter how crowded in unlicensed band. Similar to WiFi offloading, QoS (Quality of Service)/QoE (Quality of Experience) via unlicensed band cannot be guaranteed due to contention-based channel access, e.g. kinds of jitter.
2) RAN (Radio Access Network) offloading: single bearer is split between LTE unlicensed frequency (or WiFi) and LTE licensed frequency at eNB (eNode B). The eNB would assign traffic to unlicensed and licensed bands depending on for example channel condition, traffic load and so on. QoS could be guaranteed by licensed band in case of unavailability of the unlicensed band, while QoE can even be improved when both licensed and unlicensed bands can be scheduled. FIG. 1 schematically illustrates RAN offloading of traffic, in which the traffic is assigned to a LTE licensed band and a LTE unlicensed band at the eNB.

Different from traditional CN offloading in which data is offloaded at CN based on user preference, RAN offloading in LAA can provide higher QoS/QoE and spectrum efficiency by utilizing cross carrier scheduling under carrier aggregation architecture. Thus, RAN offloading can provide more advantage for promoting benefits of LTE-U.

Similar to WiFi, different charging policy on service via unlicensed band could be adopted depending on the operator's will. Charging policy includes time-based, volume-based, event-based, free, and so on. Especially, volume-based charging shall be supported in case of supporting different charging policies. Lower price in unlicensed band is reasonable since the spectrum is free. In RAN offloading, band usage (e.g. occupancy of licensed or unlicensed band) of each packet is transparent to the charging system located in CN. All packets via single bearer (same QoS) will be charged equally now. In current operator's network, the price of LTE data is always much higher than the price of WiFi data (for example, almost free). LTE-U could provide a more stable QoS by utilizing the licensed band if the unlicensed band is busy; however, much more price (in LTE price) must be paid by the users than WiFi if similar QoS/QoE can be provided by WiFi when there are only few users. On the other hand, eNB is less likely to provide LTE-U as cheap as WiFi due to the occupation of licensed band sometimes. Therefore, the price of data volume in RAN offloading should be more dynamic based on band usage, which is beneficial to both users and operators.

SUMMARY

One non-limiting and exemplary embodiment provides a band usage information generating and reporting method to support different charging for data usage of different bands when traffic is offloaded in the eNB.

In one general aspect, the techniques disclosed here feature a band usage information generating and reporting method for wireless communication performed by an eNB, comprising: generating band usage information for charging; and a reporting the band usage information to a core network (CN), wherein the band usage information involves band usage of at least a first band and a second band, and traffic is assigned to respective bands by the eNB.

According to the present disclosure, the band usage information involving band usage of different bands can be reported to the CN for processing the charging based on the band usage of the different bands. Therefore, the billing will be more accurate and reasonable.

It should be noted that general or specific embodiments may be implemented as a system, a method, an integrated circuit, a computer program, a storage medium, or any selective combination thereof.

The foregoing is a summary and thus contains, by necessity, simplifications, generalization, and omissions of details. Other aspects, features, and advantages of the devices and/or processes and/or other subject matters described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

Figure 1:
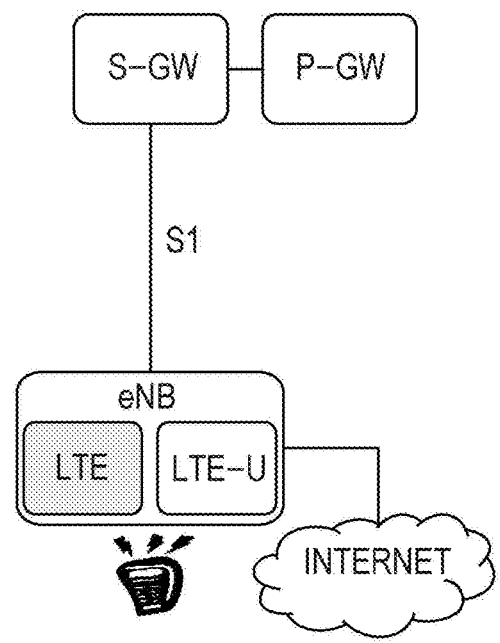
FIG. 1 schematically illustrates RAN offloading of traffic, in which the traffic is assigned to a LTE licensed band and a LTE unlicensed band at the eNB.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

In the first aspect of the present disclosure, in particular, the band usage information is reported to a packet data network gateway (PGW) via a mobility management entity (MME) and a serving gateway (SGW) from the eNB.

In the first aspect of the present disclosure, in particular, the band usage information reporting step comprises reporting the band usage information to the MME by S1-AP interface, wherein the initial setup for supporting the reporting is performed by adding a new information element (IE) in an INITIAL CONTEXT SETUP REQUEST requested by the MME.

In the first aspect of the present disclosure, in particular, the band usage information reporting step comprises reporting the band usage information to the MME by S1-AP interface, wherein the initial setup for supporting the reporting is performed by adding a new IE in an E-RAB SETUP REQUEST requested by the MME.

In the first aspect of the present disclosure, in particular, the band usage information reporting step comprises reporting the band usage information to the MME by S1-AP interface, wherein the initial setup for supporting the reporting is performed by adding a new IE in a S1 SETUP REQUEST requested by the eNB.

In the first aspect of the present disclosure, in particular, the band usage information reporting step comprises reporting the band usage information to the MME by S1-AP interface, wherein a new IE is added in a UE CONTEXT MODIFICATION REQUEST requested by the MME to trigger the reporting, and a new IE is added in a UE CONTEXT MODIFICATION RESPONSE to report the band usage information to the MME.

In the first aspect of the present disclosure, in particular, the band usage information reporting step comprises reporting the band usage information to the MME by S1-AP interface, wherein a new IE is added in an E-RAB MODIFIY REQUEST requested by the MME to trigger the reporting, and a new IE is added in an E-RAB MODIFY RESPONSE to report the band usage information to the MME.

In the first aspect of the present disclosure, in particular, the band usage information reporting step comprises reporting the band usage information to the MME by S1-AP interface, wherein a new IE is added to a CELL TRAFFIC TRACE triggered by the eNB to report the band usage information to the MME.

In the first aspect of the present disclosure, in particular, in the band usage information generating step, a counting entity at the Packet Data Convergence Protocol (PDCP) layer counts band usage of all or successfully received PDCP service data units (SDUs) for the first band and the second band respectively to generate the band usage information.

In the first aspect of the present disclosure, in particular, in non-transparent mode radio link control (RLC), the band usage information generating step comprises: a counting entity at the medium access control (MAC) layer reporting band usage state of each RLC protocol data unit (PDU) to the RLC layer; a counting entity at the RLC layer deriving band usage state of each PDCP PDU based on the indicated band usage state of corresponding RLC PDU(s) and reporting the band usage state of each PDCP PDU to the PDCP layer; and the counting entity at the PDCP layer counting the band usage of all or successfully received PDCP SDU(s) based on the indicated band usage state of corresponding PDCP PDU(s) to generate the band usage information.

In the first aspect of the present disclosure, in particular, in transparent mode RLC, the band usage information generating step comprises: a counting entity at the MAC layer reporting band usage state of each RLC PDU to the PDCP layer; and a counting entity at the PDCP layer counting the band usage of all or successfully received PDCP SDU(s) based on the indicated band usage state of corresponding RLC PDU(s) to generate the band usage information.

In the first aspect of the present disclosure, in particular, the band usage information generating step further comprises: a counting entity at the PHY layer reporting band usage state of each MAC PDU to the MAC layer; and the counting entity at the MAC layer deriving the band usage state of each RLC PDU based on the indicated band usage state of corresponding MAC PDU(s).

In the first aspect of the present disclosure, in particular, while reporting the band usage state of each PDU, an ACK/NACK indicator indicating whether the PDU is successfully received is also reported by the counting entity of the corresponding layer, and the ACK/NACK indicator together with the band usage state of each PDU is used to derive the band usage state of the SDU corresponding to the PDU.

In the first aspect of the present disclosure, in particular, the band usage state of each PDCP SDU is derived by CN marked priority of flow.

In the first aspect of the present disclosure, in particular, in the band usage information generating step, the counting entity at the PHY layer counts band usage of all or successfully received transport blocks (TBs) for the first band and the second band respectively to generate the band usage information.

In the first aspect of the present disclosure, in particular, in the band usage information generating step, the counting entity at the MAC layer counts band usage of all or successfully received MAC SDUs for the first band and the second band respectively to generate the band usage information.

In the first aspect of the present disclosure, in particular, in the band usage information generating step, the counting entity at the RLC layer counts band usage of all or successfully received RLC SDUs for the first band and the second band respectively to generate the band usage information, and the band usage state of each RLC SDU is derived from the PHY layer and/or the MAC layer.

In the first aspect of the present disclosure, in particular, the first band is a licensed band; and the second band is an unlicensed band.

In the first aspect of the present disclosure, in particular, for dual connectivity (DC) scenario of option 3C, in the band usage information generating step, data packets via Xn will be all counted as the band usage of one of the first band and the second band.

In the first aspect of the present disclosure, in particular, the band usage information is respective data volume of the first band and the second band, data volume of the first band or the second band, band usage ratio of the first band or the second band, or a reference rate based on the band usage of the first band and the second band.

In the first aspect of the present disclosure, in particular, one valid period for the band usage information is: time between last two trigger events if the reporting of the band usage information is passively triggered by the CN; or time from last reporting to current reporting if the reporting of the band usage information is actively performed by the eNB; or time between two switch events between the first band and the second band.

In the first aspect of the present disclosure, in particular, the band usage information generating and reporting method can further comprise transmitting the band usage information to a UE for which the charging is targeted.

In a second aspect of the present disclosure, there is provided a charging method for wireless communication performed by a core network (CN), comprising: a band usage information obtaining step of obtaining band usage information for charging from an eNB; and a charging processing step of processing the charging based on the band usage information, wherein the band usage information involves band usage of at least a first band and a second band, and traffic is assigned to respective bands by the eNB.

In the second aspect of the present disclosure, in particular, the CN comprises at least a MME, a SGW and a PGW, and in the band usage information obtaining step, the band usage information reported from the eNB is first received by the MME, and then reported to the PGW via the SGW by the MME.

In the second aspect of the present disclosure, in particular, the band usage information obtaining step comprises the MME receiving the band usage information reported from the eNB by S1-AP interface, wherein the initial setup for supporting the reporting is performed by adding a new information element (IE) in an INITIAL CONTEXT SETUP REQUEST requested by the MME.

In the second aspect of the present disclosure, in particular, the band usage information obtaining step comprises the MME receiving the band usage information reported from the eNB by S1-AP interface, wherein the initial setup for supporting the reporting is performed by adding a new IE in an E-RAB SETUP REQUEST requested by the MME.

In the second aspect of the present disclosure, in particular, the band usage information obtaining step comprises the MME receiving the band usage information reported from the eNB by S1-AP interface, wherein the initial setup for supporting the reporting is performed by a new IE in a S1 SETUP REQUEST requested by the eNB.

In the second aspect of the present disclosure, in particular, the band usage information obtaining step comprises the MME receiving the band usage information reported from the eNB by S1-AP interface, wherein a new IE is added in a UE CONTEXT MODIFICATION REQUEST requested by the MME to trigger the reporting, and a new IE is added in a UE CONTEXT MODIFICATION RESPONSE to report the band usage information to the MME.

In the second aspect of the present disclosure, in particular, the band usage information obtaining step comprises the MME receiving the band usage information reported from the eNB by S1-AP interface, wherein a new IE is added in an E-RAB MODIFIY REQUEST requested by the MME to trigger the reporting, and a new IE is added in an E-RAB MODIFY RESPONSE to report the band usage information to the MME.

In the second aspect of the present disclosure, in particular, the band usage information obtaining step comprises the MME receiving the band usage information reported from the eNB by S1-AP interface, wherein a new IE is added to a CELL TRAFFIC TRACE triggered by the eNB to report the band usage information to the MME.

In the second aspect of the present disclosure, in particular, the band usage information obtaining step comprises reporting the band usage information from the MME to the SGW or from the SGW to the PGW by adding a new IE in a BEARER CONTEXT TO BE MODIFIED WITHIN MODIFY BEARER REQUEST.

In the second aspect of the present disclosure, in particular, the band usage information obtaining step comprises reporting the band usage information from the MME to the SGW or from the SGW to the PGW by adding a new IE in a BEARER CONTEXT WITHIN UPDATE BEARER REQUEST for triggering and adding a new IE in a BEARER CONTEXT WITHIN UPDATE BEARER RESPONSE for reporting.

In the second aspect of the present disclosure, in particular, the first band is a licensed band; and the second band is an unlicensed band.

In the second aspect of the present disclosure, in particular, in the charging processing step, for a pre-pay user, units in the licensed band are firstly reserved or blocked, then over-reserved units are returned to the user's account based on the band usage information; and for a post-pay user, a bill will be generated based on the band usage information.

In a third aspect of the present disclosure, there is provided a band usage information generating and reporting method for wireless communication performed by a UE, comprising: a band usage information generating step of generating band usage information for charging; and a band usage information reporting step of reporting the band usage information to a core network (CN) by Non-Access Stratum (NAS), wherein the band usage information involves band usage of at least a first band and a second band, and traffic is assigned to respective bands by an eNB to which the UE is attached.

In a fourth aspect of the present disclosure, there is provided an eNode B (eNB) for generating and reporting band usage information for wireless communication, comprising: a band usage information generating unit configured to generate band usage information for charging; and a band usage information reporting unit configured to report the band usage information to a core network (CN), wherein the band usage information involves band usage of at least a first band and a second band, and traffic is assigned to respective bands by the eNB.

In a fifth aspect of the present disclosure, there is provided a core network (CN) for processing charging for wireless communication, comprising: a band usage information obtaining unit configured to obtain band usage information for charging from an eNB; and a charging processing unit configured to process the charging based on the band usage information, wherein the band usage information involves band usage of at least a first band and a second band, and traffic is assigned to respective bands by the eNB.

In a sixth aspect of the present disclosure, there is provided a mobility management entity (MME) for communicating band usage information for wireless communication, comprising: a band usage information receiving unit configured to receive band usage information for charging from an eNB; and a band usage information reporting unit configured to report the band usage information to a PGW via a SGW, wherein the band usage information involves band usage of at least a first band and a second band, and traffic is assigned to respective bands by the eNB.

In a seventh aspect of the present disclosure, there is provided a user equipment (UE) for generating and reporting band usage information for wireless communication, comprising: a band usage information generating unit configured to generate band usage information for charging; and a band usage information reporting unit configured to report the band usage information to a core network (CN) by Non-Access Stratum (NAS), wherein the band usage information involves band usage of at least a first band and a second band, and traffic is assigned to respective bands by an eNB to which the UE is attached.

It is noted that the above specific descriptions for the first aspect and the second aspect can also be applied to the third to seventh aspects unless the context indicates otherwise.

Based on current CN architecture, single service data flow (via single EPS (Evolved Packet System) bearer) could support RAN offloading (for example, DL (Down Link)). However, there are following problems: 1) No distinction between data via unlicensed and licensed band in price. 2) To operator, an average price between unlicensed and licensed price might be accounted for bearer supporting both unlicensed and licensed band based on statistics; however, this is infeasible due to unawareness of band usage at CN. 3) Even if average price could be supported somehow, to a specific user who has more data volumes via unlicensed band, the actually payment would remain unchanged. Such charging policy is not good motivation for promoting more utilization of unlicensed band when possible. Price on utilization of unlicensed band should be cheaper than utilization of licensed band, similar to that WiFi price is much cheaper than LTE currently. Therefore, separately counting for data volume via licensed band and data volume via unlicensed band is necessary for a UE working at both bands.

In order to charge data volume via a licensed band and an unlicensed band separately, band usage information for charging involving band usage of the two bands should be reported to a charging system in the CN. In other words, the CN has to know the data volume of different bands separately. It is noted that, although some embodiments may be described in the context of licensed band and unlicensed band as two bands to be charged separately, the two bands are not limited to the licensed and unlicensed bands but can be any two different bands that can be used for wireless communication, which are generally referred to a first band and a second band in the present disclosure.

In present disclosure, it is proposed that the band usage information is generated at RAN (eNB or UE), and is reported to the CN via a RAN/CN interface. Since the traffic is assigned to different bands at the eNB, the eNB and the UE can know which data uses which band based on the scheduling information. There could be two reporting mechanisms for reporting the band usage information to the CN. One is active reporting triggered by the eNB which can be periodical and/or event-triggered. The other is passive reporting triggered by CN (e.g. via PCEF (Policy and Charging Enforcement Function)) which can also be periodical and/or event-triggered.

Figure 2:
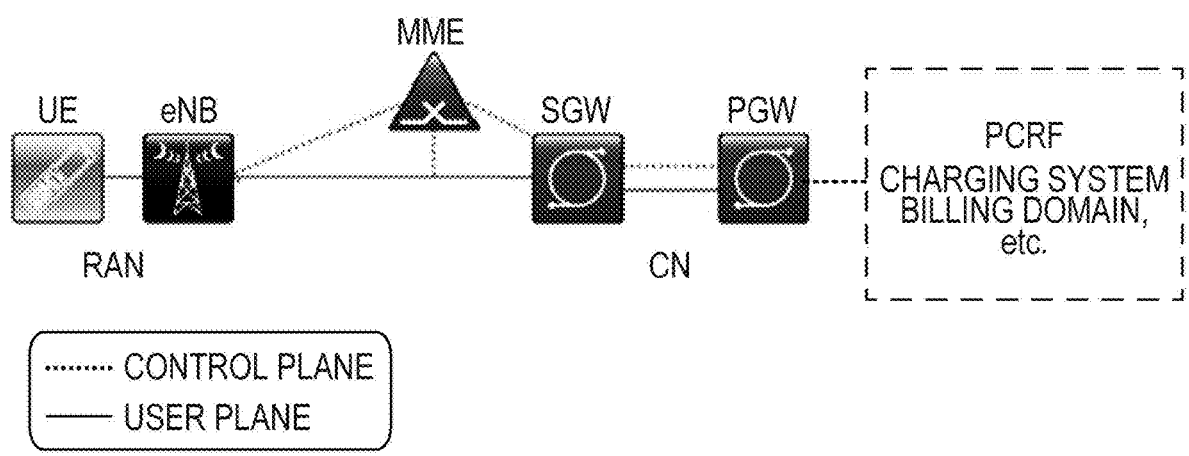
FIG. 2 illustrates an exemplary wireless communication system comprising a RAN and a CN for explaining the band usage information generating and reporting method according to an embodiment of the present disclosure.

FIG. 2 illustrates an exemplary wireless communication system comprising a RAN and a CN for explaining the band usage information generating and reporting method according to an embodiment of the present disclosure. In FIG. 2, the RAN comprises an eNB and a UE, and the CN comprises at least a MME, a SGW and a PGW. The CN can also comprise other element(s) for locating for example PCRF (Policy and Charging Rules Function), charging system, billing domain, and so on. According to the present disclosure, the band usage information can be generated at the eNB or the UE, can then reported to the CN, for example, to the PGW in which PCEF is located via the MME and the SGW. The band usage information obtained by the PGW will be used to process charging by a charging system located in the CN.

As described in the above, there may be two types of offloading (CN offloading and RAN offloading). As an example, the procedure of offloading initialization can be as follows:
1) Bearer establishment procedure
   a) Step-1: UE could request one service via only unlicensed band or both unlicensed and licensed band based on capability and subscription. Here, traditional service specific to licensed band is not affected.
   b) Step-2: PCRF could request to establish the bearer(s) according to UE request and subscription.
   c) Step-3: eNB could establish bearer at unlicensed or licensed band or both as request from CN.
2) Perform offloading
   a) eNB performs RAN offloading between a first band and a second band (e.g. a licensed and an unlicensed band) for bearer not specific to unlicensed band based on channel condition and traffic load (e.g. priority/preference/marking of service/packet/user indicated from CN).
   b) Or CN offloads the traffic to unlicensed bearer.

Specifically, each step at the bearer establishment procedure can be exemplarily described in detail as follows:
1) UE's decision at Step-1
   a) UE supporting RAN offloading would request a bearer not specific to unlicensed band (RAN offloading) if
      i) UE subscribes RAN offloading service,
      ii) Or UE manually selects RAN offloading,
      iii) Or the like.
   b) Otherwise, UE would request a bearer specific to unlicensed band (CN offloading).
2) PCRF's decision at step-2
   a) PCRF would request to establish a bearer not specific to unlicensed band (RAN offloading) if i) UE requests a bearer not specific to unlicensed band, and UE subscribes RAN offloading service,
ii) Or the like.
b) Otherwise, PCRF would request to establish a bearer specific to unlicensed band (CN offloading).
3) eNB's decision at Step-3
a) eNB would establish a bearer not specific to unlicensed band (RAN offloading) if
i) PCRF requests to establish a bearer not specific to unlicensed band, and eNB supports RAN offloading,
ii) Or the like.
Optionally, SeNB (Secondary eNB) in unlicensed band would establish the unlicensed radio bearer in case of DC option-1.
Then, eNB would offload partial/entire data to unlicensed band during transmission if
i) Unlicensed band is idle,
ii) Or unlicensed band can meet the QoS requirement,
iii) Or licensed band is heavily loaded,
iv) Or CN indicates priority/preference/marking of service/flow/packet/user
v) Or the like
b) Otherwise, eNB would establish a bearer specific to unlicensed band (CN offloading).

In particular, in the procedure of offloading initialization, UE could request a lower QoS than actually needed QoS for easier acceptance by CN, which is beneficial to licensed band under high load. Lower price will be applied for lower QoS. To meet the actually needed QoS, unlicensed band can be used if available.

Figure 3:
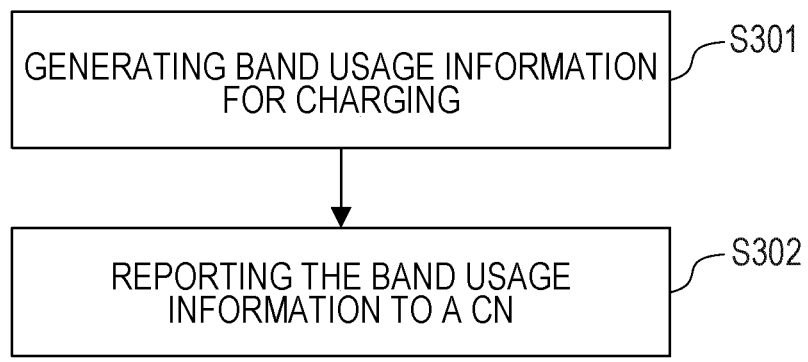
FIG. 3 illustrates a flowchart of a band usage information generating and reporting method for wireless communication performed by an eNB according to an embodiment of the present disclosure.

For RAN offloading case, traffic is assigned to a first band (e.g. licensed band) and/or a second band (e.g. unlicensed band) at the eNB. Therefore, the CN does not know which band(s) the traffic uses. According to an embodiment of the present disclosure, the eNB generates the band usage information involving two bands and reports it to the CN. FIG. 3 illustrates a flowchart of a band usage information generating and reporting method 300 for wireless communication performed by an eNB according to an embodiment of the present disclosure. The method 300 comprises a band usage information generating step 301 of generating band usage information for charging; and a band usage information reporting step 302 of reporting the band usage information to a CN. In this embodiment, traffic is assigned to respective bands by the eNB, that is, it is RAN offloading. The band usage information involves band usage of at least a first band and a second band, for example, a licensed band and an unlicensed band. It is noted that although the following embodiments may be described for the first band and the second band, there can be more than two bands involved in the present disclosure. The band usage information can be any form of information that can be used by the CN to process the charging. For example, the band usage information can be respective data volume of the first band and the second band, that is, the band usage information comprises both the data volume consuming the first band and the data volume consuming the second band, for example, 1 MB (Mega Byte) for the first band and 2 MB for the second band. Alternatively, the band usage information can comprise only data volume of one band of the first band and the second band. In this case, the data volume of the other band can be derived by subtracting the data volume of the one band from the total data volume at the CN side. Alternatively, the band usage information can be the band usage ratio (0~100%) of the first band or the second band, for example, the data volume using one (e.g. unlicensed band) of the first band and the second band is 70% of the total volume. In this case, the CN side can calculate a price or discount based on the band usage ratio. As another alternative, the band usage information can be a reference rate (e.g. 10 dollars) based on the band usage of the first band and the second band. The reference rate can be derived for example by multiplying a reference unit price by the band usage of the first band and the second band respectively. Further, the band usage information can be generated per IP flow, per bear ID, per UE, per cell, or per eNB.

Figure 4:
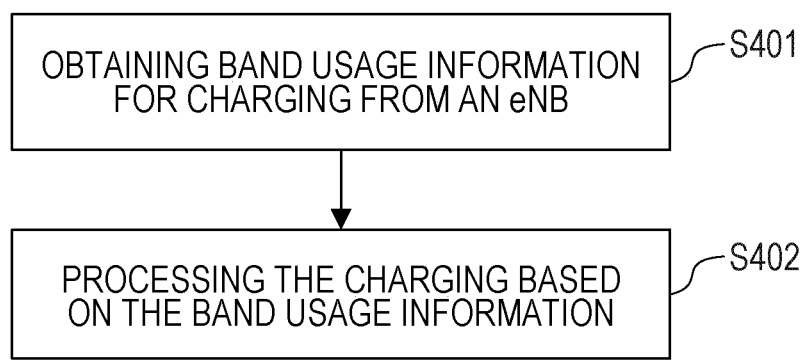
FIG. 4 illustrates a flowchart of a charging method for wireless communication performed by a CN according to an embodiment of the present disclosure.

Accordingly, at the CN side, a charging method for wireless communication can be provided. FIG. 4 illustrates a flowchart of a charging method 400 for wireless communication performed by a CN. The method 400 comprises a band usage information obtaining step 401 of obtaining band usage information for charging from an eNB and a charging processing step 402 of processing the charging based on the band usage information, wherein the band usage information involves band usage of at least a first band and a second band, and traffic is assigned to respective bands by the eNB. As shown in FIG. 2, the CN can comprise at least a MME, a SGW and a PGW, and the band usage information reported from the eNB can be first received by the MME, and then reported to the PGW via the SGW by the MME. The charging processing step 402 can be performed by a charging system in the CN. For example, for a pre-pay user, units in the licensed band can be firstly reserved or blocked, then over-reserved units are returned to the user's account based on the band usage information; and for a post-pay user, a bill can be generated based on the band usage information. It is noted that the specific manners of processing the charging based on the band usage information do not limit the scope of the disclosure, but those skilled in the art can devise various manners to process the charging depending on practical applications.

In the following, the band usage information generating step 301 will be described in detail through embodiments.

In a first embodiment, a counting entity at the Packet Data Convergence Protocol (PDCP) layer counts band usage of all or successfully received PDCP service data units (SDUs) for the first band and the second band respectively to generate the band usage information. In this embodiment, the band usage information is generated at the PDCP layer, and thus the band usage of PDCP SDUs (i.e. IP packets) can be counted. Therefore, the overhead (e.g. header and control PDUs) can be excluded. In this embodiment, the counting entity may count all PDCP SDUs whether they are received successfully. Alternatively, the counting entity may only count successfully received PDCP SDUs while omitting PDCP SDUs that are not successfully received. Herein, the "successfully received SDU or PDU" means that the eNB has successfully received the SDU or PDU for the uplink, and the eNB has successfully received ACK feedback of the SDU or PDU for the downlink. Regarding data forwarded by source eNB in case of lossless handover, the same counting criteria can be adopted as the data is from the CN. Preferably, forwarded data during lossless handover will be counted only once.

As a first example of the first embodiment, starting from the PHY layer, each layer reports its band usage state to its upper layer, and the counting entity at the PDCP layer counts the band usage of PDCP SDUs based on the band usage state of the RLC layer. In particular, a counting entity at the PHY layer reports band usage state of each MAC PDU to the MAC layer; a counting entity at the MAC layer derives the band usage state of each RLC PDU based on the indicated band usage state of corresponding MAC PDU(s) and reports the band usage state of each PLC PDU to the RLC layer; a counting entity at the RLC layer derives band usage state of each PDCP PDU based on the indicated band usage state of corresponding RLC PDU(s) and reports the band usage state of each PDCP PDU to the PDCP layer; and the counting entity at the PDCP layer counting the band usage of all or successfully received PDCP SDU(s) based on the indicated band usage state of corresponding PDCP PDU(s) to generate the band usage information.

The PHY layer can obtain the band usage state of each MAC PDU (TB) which indicates which band the TB uses from the scheduling information. After the band usage state of each MAC PDU is reported to the MAC layer, the MAC layer can derive the band usage state of each RLC PDU (MAC SDU) based on the indicated band usage state of corresponding MAC PDU(s). It is noted that MAC SDUs and MAC PDUs may not be in a one-to-one relationship. For example, one MAC SDU may be split into several MAC PDUs, or several MAC SDUs may be combined into one or more MAC PDUs. Therefore, the band usage state of a MAC SDU may indicate what percentage of the MAC SDU uses the first band or the second band. For example, if one MAC SDU is split into two MAC PDUs and one of the MAC PDUs is scheduled at the first band, then the band usage state of the MAC SDU can indicate that 50% of the MAC SDU uses the first band. Alternatively, the band usage state of the MAC SDU can be rounded. For example, if no less than half of the MAC SDU uses the first band, the band usage state of the MAC SDU indicates that the MAC SDU uses the first band. In the above example, 50% of the MAC SDU uses the first band, and thus the band usage state of the MAC SUD can be rounded to indicate that the MAC SDU uses the first band. In addition, the band usage state of a MAC SDU may also be a percentage or a rounded state because there may be retransmissions (HARQ processes) of MAC PDUs. For example, a MAC PDU may be transmitted first in the unlicensed band in a first HARQ process but the transmission does not succeed, and then a MAC PDU corresponding to the same MAC SDU is transmitted in the licensed band in a first HARQ process and the transmission succeeds. In this case, if both the successful and unsuccessful HARQ processes are considered, the band usage state of the MAC SDU should indicate 50% of the MAC SDU uses the licensed (or unlicensed) band. Alternatively, if only the successful HARQ process is considered, the band usage state of the MAC SDU should indicate the MAC SDU uses the licensed band. After the band usage state of each RLC PDU (MAC SDU) is reported to the RLC layer, the RLC layer can derive band usage state of each PDCP PDU based on the indicated band usage state of corresponding RLC PDU(s). Similar to the band usage state of the RLC PDU, the band usage state of the PDCP PDU can also be a percentage or a rounded state since there can be ARQ processes, segmentation and/or concatenation for the RLC layer. After the band usage state of each PDCP PDU is reported to the PDCP layer, the PDCP layer can derive band usage state of each PDCP SDU (IP packet), and count the band usage of the PDCP SDU(s) for the first band and the second band respectively.

The above first example is for the non-transparent mode RLC. In the transparent mode RLC as a second example, the counting at the RLC layer can be omitted. In particular, the counting entity at the MAC layer reports band usage state of each RLC PDU directly to the PDCP layer; and the counting entity at the PDCP layer counts the band usage of all or successfully received PDCP SDU(s) based on the indicated band usage state of corresponding RLC PDU(s) to generate the band usage information.

In addition, since the MAC layer at eNB can know the band usage state of each MAC SDU from the band scheduling of the MAC SDU, the reporting of the PHY layer can be omitted. Therefore, in a third example, on the basis of the first and the second examples, the steps of a counting entity at the PHY layer reporting band usage state of each MAC PDU to the MAC layer and a counting entity at the MAC layer deriving the band usage state of each RLC PDU based on the indicated band usage state of corresponding MAC PDU(s) are omitted. Instead, the counting entity at the MAC layer reports band usage state of each RLC PDU (MAC SDU) which is derived from band scheduling of the MAC SDU to the RLC layer.

In the above first to third examples, preferably, while reporting the band usage state of each PDU, an ACK/NACK indicator indicating whether the PDU is successfully received is also reported by the counting entity of the corresponding layer, and the ACK/NACK indicator together with the band usage state of each PDU is used to derive the band usage state of the SDU corresponding to the PDU. Here, the "PDU" can refer to any of MAC PDU, RLC PDU and PDCP PDU. According to this preferable example, the counting entity can determine whether a PDU is successfully received. Therefore, when the counting entity derives the band usage state of the SDU corresponding to the PDU, it can consider all PDU(s) related to the SDU or consider only successfully received PDU(s). In other words, retransmission (e.g. HARQ process in the MAC layer and ARQ process in the RLC layer) can be considered here. As described in the above, in the MAC layer, there can be HARQ processes of MAC PDUs, and when determining the band usage state of a MAC SDU, all the HARQ processes can be considered or only the successful HARQ process is considered. In the RLC layer, there can be ARQ processes of PLC PDUs, and when determining the band usage state of a PLC SDU, all the ARQ processes can be considered or only the successful ARQ process is considered. Accordingly, the counting entity at the PDCP layer can count the band usage of all or successfully received PDCP SDU(s) based on the indicated band usage state and ACK/NACK indicator of corresponding PDCP PDU(s).

In a fourth example of the first embodiment, the band usage of each PDCP SDU can be derived by CN marked priority of flow, instead of reported by a lower layer. For example, the band usage in terms of ratio can be derived from CN marked priority level e.g. level 1=10%, level 2=20%, . . . , level 9=90%. The RAN offloading criteria can be based on CN indicated priority/marking. A User Plane CONgestion management (UPCON) related mechanism where the GGSN/PGW/TDF marks each user plane data packet delivered in the downlink direction might be adopted as RAN offloading criteria. The marking is meant to support traffic prioritization between flows mapped to the same QCI, i.e. different IP flows within a bearer may be associated with different values of the marking in order to address RAN User Plane congestion, thus the flows with lower prioritization would be offloaded to unlicensed band if congestion happens in licensed band.

In the above first embodiment, the band usage information is generated at the PDCP layer. However, the band usage information can also be generated at other layers, i.e. the PHY layer, the MAC layer, or the RLC layer.

In a second embodiment, the counting entity at the PHY layer can count band usage of all or successfully received transport blocks (TBs) for the first band and the second band respectively to generate the band usage information. In this case, the band usage information can indicate the band usage of PHY data to the CN. Preferably, in order to reduce specification impact as well as counting inaccuracy, the PHY layer can count the relative ratio of band usage for the first band and the second band as the band usage information.

In a third embodiment, the counting entity at the MAC layer can count band usage of all or successfully received MAC SDUs for the first band and the second band respectively to generate the band usage information. In this case, the band usage information can indicate the band usage of MAC data to the CN. Preferably, in order to reduce specification impact as well as counting inaccuracy, the MAC layer can count the relative ratio of band usage for all or successfully received MAC SDUs. In particular, the MAC layer first counts data volume of all or successfully received MAC PDUs separately according to the scheduled band (the first band or the second band), e.g. 1 k bit via licensed band and 2 k bit via unlicensed band for an observation period. Then, the counting entity at the MAC layer generates the ratio of the first or second band data volume (e.g. unlicensed data volume) to the total data volume. Since percentage of overhead and higher layer retransmission will be equal between MAC PDUs via the unlicensed band and MAC PDUs via the licensed bands in statistics, the ratio observed over a longer period is less impacted by over counting than data volume observed over the period. For example, the ratio may be 2 k/(1 k+2 k=0.67≈70% which can be represented by 4 bit. After the band usage ratio as the band usage information is generated, it can be reported to the CN in a manner transparent to RLC and PDCP.

In a fourth embodiment, the counting entity at the RLC layer can count band usage of all or successfully received RLC SDUs for the first band and the second band respectively to generate the band usage information, and the band usage state of each RLC SDU can be derived from the PHY layer and/or the MAC layer. Preferably, in order to reduce specification impact as well as counting inaccuracy, the RLC layer can count the relative ratio of band usage for the first band and the second band as the band usage information.

In the above first to fourth embodiment, the basic application scenario is carrier aggregation. In a fifth embodiment, for dual connectivity scenario (DC) of option 3C (refer to 3GPP TR 36.842, Study on Small Cell enhancements for E-UTRA and E-UTRAN; Higher layer aspects), data packets via Xn can be all counted as the band usage of one of the first band and the second band, for example, the unlicensed band. Then counting procedure would be that the PDCP layer counts the data volume of PDCP SDUs separately according to Xn separation.

In the above, the band usage information generating step is described in detail by embodiments. After the band usage information is generated, it can be reported to the CN. In addition, the band usage information can also be transmitted to a UE for which the charging is targeted. In this case, the UE can know its band usage status.

In the following, the band usage information reporting step 302 by the eNB and the band usage information obtaining step 401 by the CN will be described in detail by embodiments, in which the band usage information is first reported from the eNB to the MME by S1-AP interface as specified in TS 36.413 (refer to 3GPP TS36.413: S1 Application Protocol (S1AP)). Before actually reporting the band usage information from the eNB to the MME, the initial setup for supporting the reporting should be performed.

In a sixth embodiment, the band usage information can be reported in a Context Management procedure of S1-MME (S1-AP in TS 36.413) interface. If both the eNB and the UE support the two band operation (e.g. LTE-U) based on INITIAL UE MESSAGE, the initial setup for supporting the reporting can be performed by adding a new IE in an INITIAL CONTEXT SETUP REQUEST requested by the MME. Here, a new IE can be added for all E-RABs or added for certain E-RAB(s). Table 1 illustrates the INITIAL CONTEXT SETUP REQUEST added with a new IE (Unlicensed Band Operation) for all E-RABs and/or a certain E-RAB.

TABLE 1

INITIAL CONTEXT SETUP REQUEST

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | M | | 9.2.1.20 | | YES | reject |
| E-RAB to Be Setup List | | 1 | | | YES | reject |
| >E-RAB to Be Setup Item IEs | | 1 . . . <maxnoofE-RABs> | | | EACH | reject |
| >>E-RAB ID | M | | 9.2.1.2 | | — | |
| >>E-RAB Level QoS Parameters | M | | 9.2.1.15 | Includes necessary QoS parameters. | — | |
| >>Transport Layer Address | M | | 9.2.2.1 | | — | |
| >>GTP-TEID | M | | 9.2.2.2 | | — | |
| >>NAS-PDU | O | | 9.2.3.5 | | — | |
| >>Correlation ID | O | | 9.2.1.80 | | YES | ignore |
| >>Unlicensed Band Operation | O | | ENUMERATED (true) | | YES | ignore |
| UE Security Capabilities | M | | 9.2.1.40 | | YES | reject |
| Security Key | M | | 9.2.1.41 | The KeNB is provided after the key-generation in the MME, see TS 33.401 [15]. | YES | reject |
| Trace Activation | O | | 9.2.1.4 | | YES | ignore |
| Handover Restriction List | O | | 9.2.1.22 | | YES | ignore |

TABLE 1-continued

INITIAL CONTEXT SETUP REQUEST

| IE/Group Name | Presence | Range | IE type and reference | Semantics description | Criticality | Assigned Criticality |
|---|---|---|---|---|---|---|
| UE Radio Capability | O | | 9.2.1.27 | | YES | ignore |
| Subscriber Profile ID for RAT/Frequency priority | O | | 9.2.1.39 | | YES | ignore |
| CS Fallback Indicator | O | | 9.2.3.21 | | YES | reject |
| SRVCC Operation Possible | O | | 9.2.1.58 | | YES | ignore |
| CSG Membership Status | O | | 9.2.1.73 | | YES | ignore |
| Registered LAI | O | | 9.2.3.1 | | YES | ignore |
| GUMMEI | O | | 9.2.3.9 | This IE indicates the MME serving the UE. | YES | ignore |
| MME UE S1AP ID 2 | O | | 9.2.3.3 | This IE indicates the MMEUE S1AP ID assigned by the MME. | YES | ignore |
| Management Based MDT Allowed | O | | 9.2.1.83 | | YES | ignore |
| Management Based MDT PLMN List | O | | MDT PLMN List 9.2.1.89 | | YES | ignore |
| Unlicensed Band Operation | O | | ENUMERATED (true) | | YES | ignore |

Figure 5:
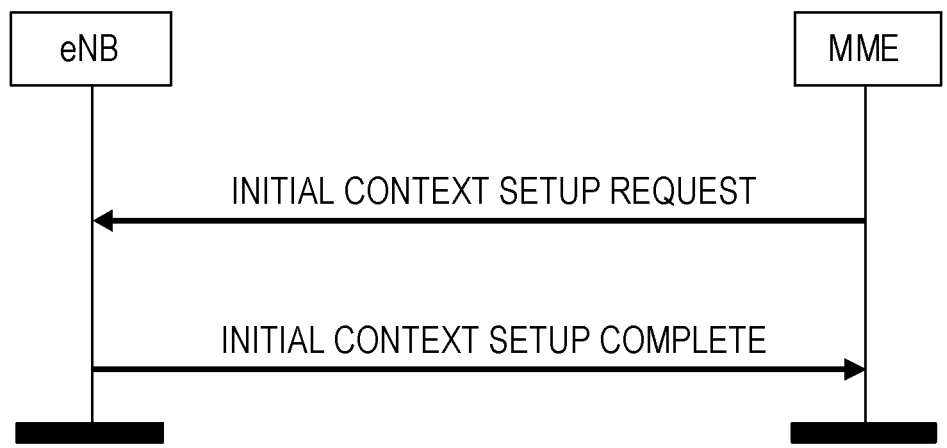
FIG. 5 schematically illustrates the initial setup of the reporting from the eNB to the MME in an embodiment of the present disclosure.

In Table 1, a new IE (Unlicensed Band Operation) which is underlined is added for the UE (all E-RABs) and/or a certain E-RAB. It is noted that the name of the IE is only an example. When performing the initial setup, the MME can send the INITIAL CONTEXT SETUP REQUEST added with the new IE to the eNB, and the eNB may feedback an INITIAL CONTEXT SETUP COMPLETE to the MME, as shown in FIG. 5 which schematically illustrates the initial setup of the reporting in this embodiment.

Figure 6:
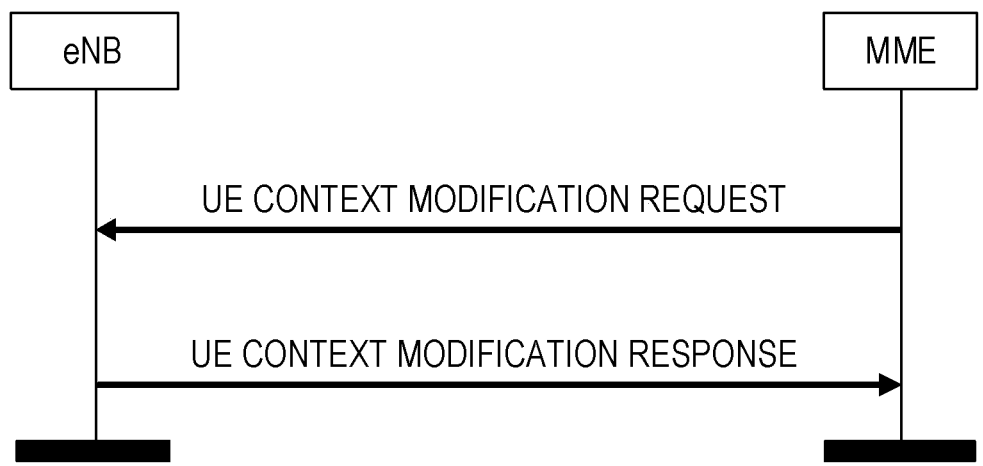
FIG. 6 schematically illustrates the reporting from the eNB to the MME in an embodiment of the present disclosure.

After the initial setup is completed, the band usage information can be reported from the eNB to the MME. In this embodiment, the reporting can be triggered by the MME in a UE Context Modification procedure. As shown in FIG. 6, the MME sends a UE CONTEXT MODIFICATION REQUEST to the eNB to trigger the reporting, and the eNB feedbacks a UE CONTEXT MODIFICATION RESPONSE with the band usage information to the MME. In particular, a new IE can be added in the UE CONTEXT MODIFICATION REQUEST requested by the MME to trigger the reporting, and a new IE can be added in the UE CONTEXT MODIFICATION RESPONSE to report the band usage information to the MME. Here, the triggering and reporting can be performed for the UE (all E-RABs) and/or certain E-RAB(s). Table 2 illustrates the UE CONTEXT MODIFICATION REQUEST added with a new IE (Band Usage Query) for all E-RABs and/or a certain E-RAB.

TABLE 2

UE CONTEXT MODIFICATION REQUEST

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| Security Key | O | | 9.2.1.41 | A fresh KeNB is provided after performing a key-change on the fly procedure in the MME, see TS 33.401 [15]. | YES | reject |
| Subscriber Profile ID for RAT/Frequency priority | O | | 9.2.1.39 | | YES | ignore |
| UE Aggregate Maximum Bit Rate | O | | 9.2.1.20 | | YES | ignore |
| CS Fallback Indicator | O | | 9.2.3.21 | | YES | reject |
| UE Security Capabilities | O | | 9.2.1.40 | | YES | reject |
| CSG Membership Status | O | | 9.2.1.73 | | YES | ignore |
| Registered LAI | O | | 9.2.3.1 | | YES | ignore |
| E-RAB to Be Query List | O | 1 | | | YES | ignore |
| >E-RAB to Be Query Item IEs | O | 1 . . . <maxnoofE-RABs> | | | EACH | ignore |

TABLE 2-continued

UE CONTEXT MODIFICATION REQUEST

| IE/Group Name | Presence | Range | IE type and reference | Semantics description | Criticality | Assigned Criticality |
|---|---|---|---|---|---|---|
| >>E-RAB ID | O | | 9.2.1.2 | | — | |
| >>Band Usage Query | O | | ENUMERATED (true) | | YES | ignore |
| Band Usage Query | O | | ENUMERATED (true) | | YES | ignore |

In Table 2, a new IE (Band Usage Query) which is underlined is added for the UE (all E-RABs) and/or a certain E-RAB. It is noted that the name of the IE is only an example. After the MME sends the UE CONTEXT MODIFICATION REQUEST added with Band Usage Query, the eNB can feedback a UE CONTEXT MODIFICATION RESPONSE with a new IE (e.g. Band Usage Report) to report the band usage information to the MME. Table 3 illustrates the UE CONTEXT MODIFICATION RESPONSE added with a new IE (Band Usage Report) for the UE (all E-RABs) and/or a certain E-RAB, in which the new IE is underlined. In Table 3, the "IE type and reference" of "Band Usage Report" is defined as "ratio", and the "Semantics description" is "Unlicensed band to licensed band". In other words, in this example, the band usage information indicates the ratio of the band usage of the unlicensed band to the band usage of the licensed band. However, it is obvious that this form of the band usage information is only an example, and the band usage information herein can adopt any other suitable form.

TABLE 3

UE CONTEXT MODIFICATION RESPONSE

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | ignore |
| eNB UE S1AP ID | M | | 9.2.3.4 | | YES | ignore |
| Criticality Diagnostics | O | | 9.2.1.21 | | YES | ignore |
| E-RAB to Be Report List | O | 1 | | | YES | ignore |
| >E-RAB to Be Report Item IEs | O | 1 . . . <maxnoofE-RABs> | | | EACH | ignore |
| >>E-RAB ID | O | | 9.2.1.2 | | — | |
| >>Band Usage Report | O | | Ratio | Unlicensed band to licensed band | YES | ignore |
| Band Usage Report | O | | Ratio | Unlicensed band to licensed band | YES | ignore |

In a seventh embodiment, the band usage information can be reported in an E-RAB Management procedure of S1-MME (S1-AP in TS 36.413) interface. If both the eNB and the UE support two band operation (e.g. LTE-U) based on INITIAL UE MESSAGE, the initial setup for supporting the reporting can be performed by adding a new IE in an E-RAB SETUP REQUEST requested by the MME. Here, a new IE can be added for the UE (all E-RABs) or added for certain E-RAB(s). Table 4 illustrates the E-RAB SETUP REQUEST added with a new IE (Unlicensed Band Operation) for all E-RABs and/or a certain E-RAB.

TABLE 4

E-RAB SETUP REQUEST

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | O | | 9.2.1.20 | | YES | reject |
| E-RAB to be Setup List | | 1 | | | YES | reject |
| >E-RAB To Be Setup Item IEs | | 1 ... <maxnoofE-RABs> | | | EACH | reject |
| >>E-RAB ID | M | | 9.2.1.2 | | — | |
| >>E-RAB Level QoS Parameters | M | | 9.2.1.15 | Includes necessary QoS parameters. | — | |
| >>Transport Layer Address | M | | 9.2.2.1 | | — | |
| >>GTP-TEID | M | | 9.2.2.2 | EPC TEID. | — | |
| >>NAS-PDU | M | | 9.2.3.5 | | — | |
| >>Correlation ID | O | | 9.2.1.80 | | YES | ignore |
| >><u>Unlicensed Band Operation</u> | O | | ENUMERATED (true) | | YES | ignore |
| <u>Unlicensed Band Operation</u> | O | | ENUMERATED (true) | | YES | ignore |

Figure 7:
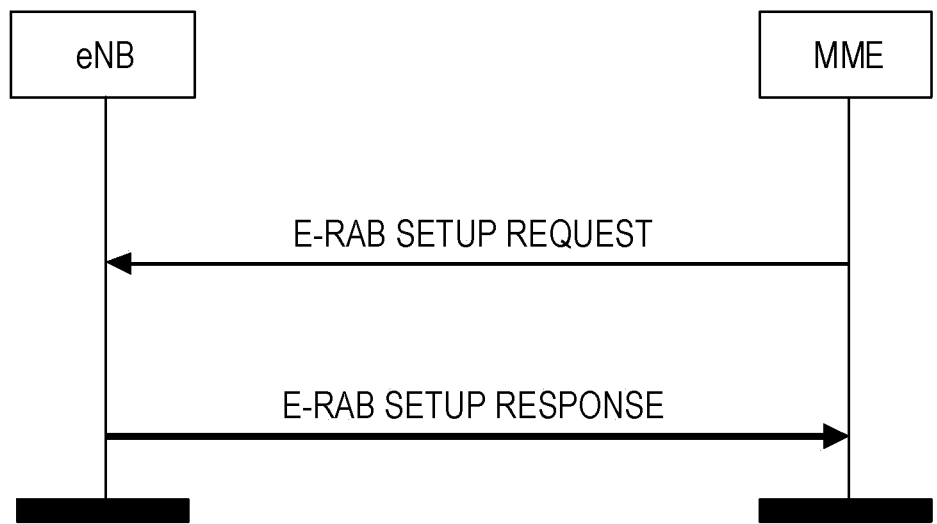
FIG. 7 schematically illustrates the initial setup of the reporting from the eNB to the MME in an embodiment of the present disclosure.

In Table 4, a new IE (Unlicensed Band Operation) which is underlined is added for the UE (all E-RABs) and/or a certain E-RAB. It is noted that the name of the IE is only an example. When performing the initial setup, the MME can send the E-RAB SETUP REQUEST added with the new IE to the eNB, and the eNB may feedback an E-RAB SETUP COMPLETE to the MME, as shown in FIG. 7 which schematically illustrates the initial setup of the reporting in this embodiment.

Figure 8:
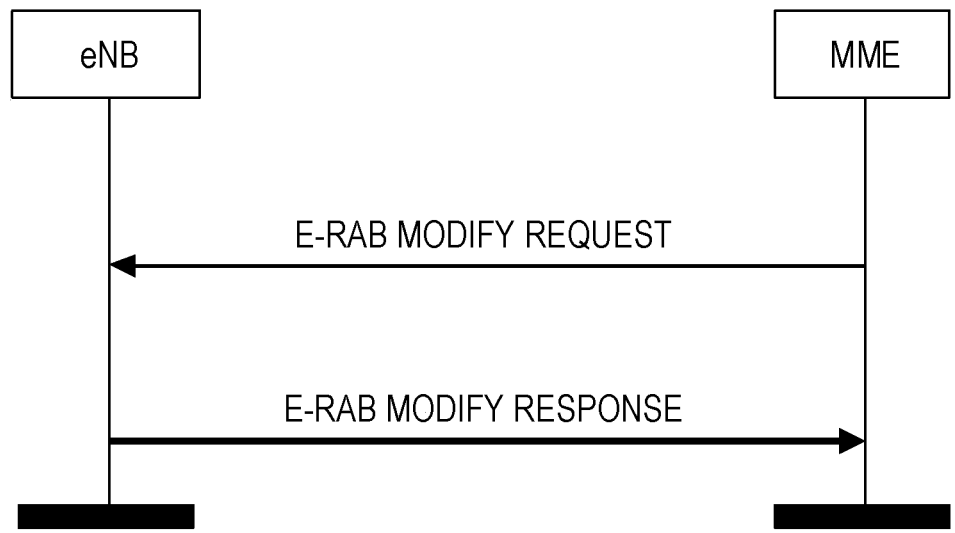
FIG. 8 schematically illustrates the reporting from the eNB to the MME in an embodiment of the present disclosure.

After the initial setup is completed, the band usage information can be reported from the eNB to the MME. In this embodiment, the reporting can be triggered by the MME in an E-RAB Modify procedure. As shown in FIG. 8, the MME sends an E-RAB MODIFY REQUEST to the eNB to trigger the reporting, and the eNB feedbacks an E-RAB MODIFY RESPONSE with the band usage information to the MME. In particular, a new IE can be added in an E-RAB MODIFY REQUEST requested by the MME to trigger the reporting, and a new IE can be added in an E-RAB MODIFY RESPONSE to report the band usage information to the MME. Here, the triggering and reporting can be performed for all E-RABs and/or certain E-RAB(s). Table 5 illustrates the E-RAB MODIFY REQUEST added with a new IE (Band Usage Query) for all E-RABs and/or a certain E-RAB.

TABLE 5

E-RAB MODIFY REQUEST

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | O | | 9.2.1.20 | | YES | reject |
| E-RAB to be Modified List | | 1 | | | YES | reject |
| >E-RAB To Be Modified Item IEs | | 1 ... <maxnoofE-RABs> | | | EACH | reject |
| >>E-RAB ID | M | | 9.2.1.2 | | — | |
| >>E-RAB Level | M | | 9.2.1.15 | Includes | — | |

TABLE 5-continued

E-RAB MODIFY REQUEST

| IE/Group Name | Presence | Range | IE type and reference | Semantics description | Criticality | Assigned Criticality |
|---|---|---|---|---|---|---|
| QoS Parameters | | | | necessary QoS parameters. | | |
| >>NAS-PDU | M | | 9.2.3.5 | | — | |
| >>Band Usage Query | O | | ENUMERATED (true) | | YES | ignore |
| Band Usage Query | O | | ENUMERATED (true) | | YES | ignore |

In Table 5, a new IE (Band Usage Query) which is underlined is added for the UE (all E-RABs) and/or a certain E-RAB. It is noted that the name of the IE is only an example. After the MME sends the E-RAB MODIFY REQUEST added with Band Usage Query, the eNB can feedback an E-RAB MODIFY RESPONSE with a new IE (e.g. Band Usage Report) to report the band usage information to the MME. Table 6 illustrates the E-RAB MODIFY RESPONSE added with a new IE (Band Usage Report) for all E-RABs and/or a certain E-RAB, in which the new IE is underlined. In Table 6, the "IE type and reference" of "Band Usage Report" is defined as "ratio", and the "Semantics description" is "Unlicensed band to licensed band". In other words, in this example, the band usage information indicates the ratio of the band usage of the unlicensed band to the band usage of the licensed band. However, it is obvious that this form of the band usage information is only an example, and the band usage information herein can adopt any other suitable form.

TABLE 6

E-RAB MODIFY RESPONSE

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | ignore |
| eNB UE S1AP ID | M | | 9.2.3.4 | | YES | ignore |
| E-RAB Modify List | | 0 . . . 1 | | | YES | ignore |
| >E-RAB Modify Item IEs | | 1 . . . <maxnoofE-RABs> | | | EACH | ignore |
| >>E-RAB ID | M | | 9.2.1.2 | | — | |
| >>Band Usage Report | O | | Ratio | Unlicensed band to licensed band | YES | ignore |
| E-RAB Failed to Modify List | O | | E-RAB List 9.2.1.36 | A value for E-RAB ID shall only be present once in E-RAB Modify List IE + E-RAB Failed to Modify List IE. | YES | ignore |
| Criticality Diagnostics | O | | 9.2.1.21 | | YES | ignore |
| Band Usage Report | O | | Ratio | Unlicensed band to licensed band | YES | ignore |

It is noted that the initial setup procedures and the reporting procedures in the sixth embodiment and the seventh embodiment can be exchanged. In addition, other initial setup procedures and reporting procedures can also be applied, and all those initial setup procedures and reporting procedures can be combined arbitrarily. Particularly, the initial setup may not be needed for the reporting according to the implementation of the eNB and the CN.

In an eight embodiment, another initial setup procedure is provided. In this embodiment, the initial setup is requested by the eNB. In particular, the initial setup for supporting the reporting is performed by adding a new IE in a S1 SETUP REQUEST requested by the eNB. Table 7 illustrates the S1 SETUP REQUEST added with a new IE (Unlicensed Band Operation).

TABLE 7

S1 SETUP REQUEST

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Global eNB ID | M | | 9.2.1.37 | | YES | reject |
| eNB Name | O | | PrintableString (1 . . . 150, . . .) | | YES | ignore |
| Supported TAs | | 1 . . . <maxnoofTACs> | | Supported TAs in the eNB. | GLOBAL | reject |
| >TAC | M | | 9.2.3.7 | Broadcasted TAC. | — | |
| >Broadcast PLMNs | | 1 . . . <maxnoofBPLMNs> | | Broadcasted PLMNs. | — | |
| >>PLMN Identity | M | | 9.2.3.8 | | | |
| Default Paging DRX | M | | 9.2.1.16 | | YES | ignore |
| CSG Id List | | 0 . . . 1 | | | GLOBAL | reject |
| >CSG Id | M | 1 . . . <maxnoofCSGIds> | 9.2.1.62 | | | |
| Unlicensed Band Operation | O | | ENUMERATED (true) | | YES | ignore |

Figure 9:
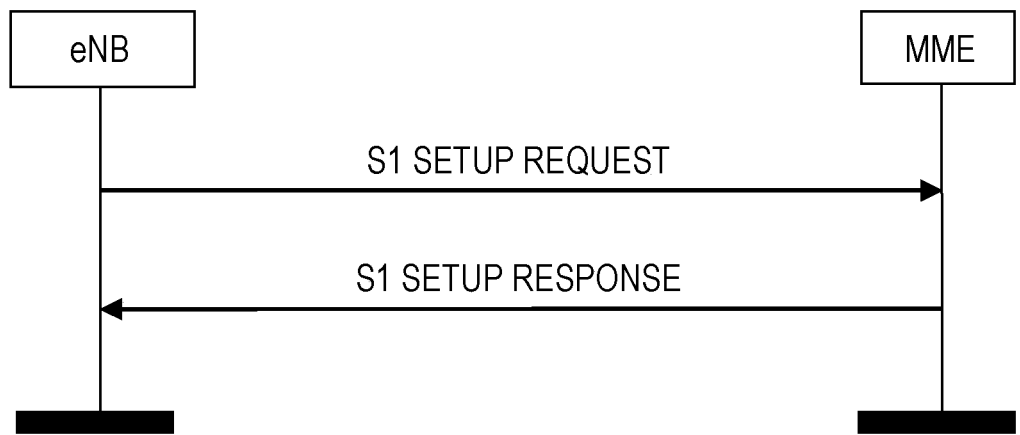
FIG. 9 schematically illustrates the initial setup of the reporting from the eNB to the MME in an embodiment of the present disclosure.

In Table 7, a new IE (Band Usage Report) which is underlined is added. It is noted that the name of the IE is only an example. When performing the initial setup, the eNB can send the S1 SETUP REQUEST added with the new IE to the MME, and the MME may feedback a S1 SETUP COMPLETE to the eNB, as shown in FIG. 9 which schematically illustrates the initial setup of the reporting in this embodiment.

Figure 10:
FIG. 10 schematically illustrates the reporting from the eNB to the MME in an embodiment of the present disclosure.

In a ninth embodiment, another reporting procedure is provided. In this embodiment, the reporting is triggered by eNB (i.e. active reporting) and performed in a Trace Procedure of S1-MME (S1-AP in TS 36.413) interface. In particular, a new IE is added to a CELL TRAFFIC TRACE triggered by the eNB to report the band usage information to the MME. Table 8 illustrates the CELL TRAFFIC TRACE added with a new IE (Band Usage Report, which is underlined) for all E-RABs and/or a certain E-RAB. In Table 8, the "IE type and reference" of "Band Usage Report" is defined as "ratio", and the "Semantics description" is "Unlicensed band to licensed band". In other words, in this example, the band usage information indicates the ratio of the band usage of the unlicensed band to the band usage of the licensed band. However, it is obvious that this form of the band usage information is only an example, and the band usage information herein can adopt any other suitable form. FIG. 10 schematically illustrates the active reporting by the CELL TRAFFIC TRACE according to the embodiment.

TABLE 8

CELL TRAFFIC TRACE

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| MME UE S1AP ID | M | | 9.2.3.3 | | YES | reject |
| eNB UE S1AP ID | M | | 9.2.3.4 | | YES | reject |
| E-UTRAN Trace ID | M | | OCTET STRING (8) | The E-UTRAN Trace ID IE is composed of the following: Trace Reference defined in TS 32.422 [10] (leftmost 6 octets, with PLMN information coded as | YES | ignore |

TABLE 8-continued

CELL TRAFFIC TRACE

| IE/Group Name | Presence | Range | IE type and reference | Semantics description | Criticality | Assigned Criticality |
|---|---|---|---|---|---|---|
| | | | | in 9.2.3.8), and Trace Recording Session Reference defined in TS 32.422 [10] (last 2 octets). | | |
| E-UTRAN CGI | M | | 9.2.1.38 | | YES | ignore |
| Trace Collection Entity IP Address | M | | Transport Layer Address 9.2.2.1 | Defined in TS 32.422 [10] | YES | ignore |
| Privacy Indicator | O | | ENUMERATED (Immediate MDT, Logged MDT, . . .) | | YES | ignore |
| E-RAB to Be Report List | O | 1 | | | YES | ignore |
| >E-RAB to Be Report Item IEs | O | 1 . . . <maxnoofE-RABs> | | | EACH | ignore |
| >>E-RAB ID | O | | 9.2.1.2 | | — | |
| >>Band Usage Report | O | | Ratio | Unlicensed band to licensed band | YES | ignore |
| Band Usage Report | O | | Ratio | Unlicensed band to licensed band | YES | ignore |

In this above, the reporting from the eNB to the MME is described in detail by embodiments. After the MME receives the band usage information, the MME can report the band usage information to the SGW, and the SGW can report the band usage information to the PGW. The reporting from the MME to the SGW and from the SGW to the PGW can be performed by GTP (GPRS Tunnelling Protocol)-based interfaces (S11, S5/S8). In the following, the reporting of the band usage information from the MME to the SGW and from the SGW to the PGW will be described by embodiments.

In a tenth embodiment, the band usage information is actively reported to from the MME to the SGW or from the SGW to the PGW. In particular, the band usage information is reported from the MME to the SGW and from the SGW to the PGW by adding a new IE in a BEARER CONTEXT TO BE MODIFIED WITHIN MODIFY BEARER REQUEST. Table 9 illustrates the BEARER CONTEXT TO BE MODIFIED WITHIN MODIFY BEARER REQUEST added with a new IE (Band usage report). In Table 9, the "Band Usage Report" is exemplarily defined as "Ratio of unlicensed band to licensed band", in other words, the band usage information indicates the ratio of the band usage of the unlicensed band to the band usage of the licensed band. However, it is obvious that this form of the band usage information is only an example, and the band usage information herein can adopt any other suitable form.

TABLE 9

BEARER CONTEXT TO BE MODIFIED WITHIN MODIFY BEARER REQUEST

| Octets 1 | Bearer Context IE Type = 93 (decimal) |
| Octets 2 and 3 | Length = n |
| Octets 4 | Spare and Instance fields |

| Information elements | P | Condition/Comment | IE Type | Ins. |
|---|---|---|---|---|
| EPS Bearer ID | M | See NOTE2. | EBI | 0 |
| S1 eNodeB F-TEID | C | This IE shall be sent on the S11 interface if the S1-U is being used: for an eUTRAN initial attach a UE triggered Service Request in all S1-U GTP-U tunnel setup procedure during a TAU procedure (see 3GPP TS 24.301 [23])/ handover cases. If an MME is aware that the eNodeB supports both IP address types, the MME shall send both IP addresses within an F-TEID IE. If only one IP address is included, then the SGW shall assume that the eNodeB does not support the other IP address type. | F-TEID | 0 |
| S5/8-U SGW F-TEID | C | This IE shall be sent on the S5/S8 interfaces for a Handover or a TAU/RAU with a SGW change. | F-TEID | 1 |
| S12 RNC F-TEID | C | If available, this IE shall be included if the message is sent on the S4 interface if S12 interface is being used. If an S4-SGSN is aware that the RNC supports both IP address types, the S4-SGSN shall send both IP addresses within an F-TEID IE. If only one IP address is included, then the SGW shall assume that the RNC does not support the other IP address type. See NOTE2. | F-TEID | 2 |
| S4-U SGSN F-TEID | C | If available, this IE shall be included if the message is sent on the S4 interface, if S4-U is being used. If an S4-SGSN supports both IP address types, the S4-SGSN shall send both IP addresses | F-TEID | 3 |

TABLE 9-continued

BEARER CONTEXT TO BE MODIFIED WITHIN MODIFY BEARER REQUEST

|   |   |   |   |   |
|---|---|---|---|---|
| | | within an F-TEID IE. If only one IP address is included, then the SGW shall assume that the S4-SGSN does not support the other IP address type. | | |
| Band usage report | O | Ratio of unlicensed band to licensed band | Ratio | 0 |

NOTE 1:
If only EPS Bearer ID IE is included in the Bearer Context to be modified IE during the TAU/RAU without SGW change procedure, the SGW shall remove the stored SGSN/RNC/eNodeB userplane F-TEID locally.
NOTE2:
When Direct Tunnel is used in 3G, e.g. during a Service Request procedure if the UE requests to establish a partial set of radio access bearers and if the SGSN accepts it, or during an SRNS relocation procedure with some bearer contexts being preserved, the SGSN shall provide EBI(s) without S12 RNC F-TEID(s) for these bearer context(s) without corresponding radio access bearer(s) being established. The SGW shall be able to handle these bearer context(s). However, in earlier releases this behaviour may not be supported by the SGW and hence for such SGW, the SGSN shall provide EBI together with S12 RNC F-TEID for each of the bearer context(s) in the Bearer Context to be modified IE.

In an eleventh embodiment, the band usage information is passively reported from the MME to the SGW or from the SGW to the PGW. In particular, the band usage information is reported from the MME to the SGW or from the SGW to the PGW by adding a new IE in a BEARER CONTEXT WITHIN UPDATE BEARER REQUEST for triggering and adding a new IE in a BEARER CONTEXT WITHIN UPDATE BEARER RESPONSE for reporting. Tables 10 and 11 respectively illustrate the BEARER CONTEXT WITHIN UPDATE BEARER REQUEST added with a new IE (Band usage Query) and the BEARER CONTEXT WITHIN UPDATE BEARER RESPONSE added with a new IE (Band usage Report). In Table 11, the "Band Usage Report" is exemplarily defined as "Ratio of unlicensed band to licensed band", in other words, the band usage information indicates the ratio of the band usage of the unlicensed band to the band usage of the licensed band. However, it is obvious that this form of the band usage information is only an example, and the band usage information herein can adopt any other suitable form.

TABLE 10

BEARER CONTEXT WITHIN UPDATE BEARER REQUEST

| | | | | |
|---|---|---|---|---|
| Octet 1 | Bearer Context IE Type = 93 (decimal) | | | |
| Octets 2 and 3 | Length = n | | | |
| Octet 4 | Spare and Instance fields | | | |

| Information elements | P | Condition/Comment | IE Type | Ins. |
|---|---|---|---|---|
| EPS Bearer ID | M | | EBI | 0 |
| TFT | C | This IE shall be included on the S5/S8, S4/S11 and S2a/S2b interfaces if message relates to Bearer Modification and TFT change. | Bearer TFT | 0 |
| Bearer Level QoS | C | This IE shall be included on the S5/S8, S4/S11 and S2a/S2b interfaces if QoS modification is requested | Bearer QoS | 0 |
| Bearer Flags | O | Applicable flags: PPC (Prohibit Payload Compression): this flag may be set on the S5/S8 and S4/S11 interfaces. vSRVCC indicator: This IE may be included by the PGW on the S5/S8 interface according to 3GPP TS 23.216 [43]. When received from S5/S8, SGW shall forward on the S11 interface. | Bearer Flags | 0 |
| Protocol Configuration Options (PCO) | CO | PGW shall include Protocol Configuration Options (PCO) IE on the S5/S8 interface, if available. This bearer level IE takes precedence over the PCO IE in the message body if they both exist. If SGW receives this IE, SGW shall forward it to SGSN/MME on the S4/S11 interface. | PCO | 0 |
| Band Usage Query | O | | ENUMERATED (true) | 0 |

TABLE 11

BEARER CONTEXT WITHIN UPDATE BEARER RESPONSE

| | | | | |
|---|---|---|---|---|
| Octet 1 | Bearer Context IE Type = 93 (decimal) | | | |
| Octets 2 and 3 | Length = n | | | |
| Octet 4 | Spare and Instance fields | | | |

| Information elements | P | Condition/Comment | IE Type | Ins. |
|---|---|---|---|---|
| EPS Bearer ID | M | | EBI | 0 |
| Cause | M | This IE Indicates if the bearer handling was successful, and if not, gives information on the reason. | Cause | 0 |
| S4-U SGSN F-TEID | C | This IE shall be included on the S4 interface when direct tunnel is not established. See NOTE 1. | F-TEID | 0 |

TABLE 11-continued

BEARER CONTEXT WITHIN UPDATE BEARER RESPONSE

| S12 RNC F-TEID | C | This IE shall be included on the S4 interface when direct tunnel flag is set to 1. See NOTE 1. | F-TEID | 1 |
| --- | --- | --- | --- | --- |
| Protocol Configuration Options (PCO) | CO | An MME/SGSN shall include the PCO IE if such information was received from the UE. If the SGW receives this IE, the SGW shall forward it to PGW on the S5/S8 interface. This bearer level IE takes precedence over the PCO IE in the message body if they both exist. | PCO | 0 |
| Band Usage Report | O | Ratio of unlicensed band to licensed band | Ratio | 0 |

NOTE 1:
In some scenarios, the SGSN is unable to provide neither the S12 RNC F-TEID nor the S4-U SGSN F-TEID in the Update Bearer Response message, e.g. when Direct Tunnel is used in 3G and the UE is in IDLE mode, for a network requested user location retrieval procedure, the SGSN is unable to provide S12 RNC F-TEID. In those scenarios, the SGSN shall provide EBI(s) without S12 RNC F-TEID(s) and S4-U SGSN F-TEID. The SGW shall be able to handle these bearer context(s). However, in earlier releases this behaviour may not be supported by the SGW and hence for such an SGW, in order to be backward compatible, the SGSN shall provide EBI(s) together with either the S4-U SGSN F-TEID or the S12 RNC F-TEID.

In the eleventh embodiment, when reporting from the MME to the SGW, the SGW sends a BEARER CONTEXT WITHIN UPDATE BEARER REQUEST to the MME for triggering, and the MME feedbacks a BEARER CONTEXT WITHIN UPDATE BEARER RESPONSE to the SGW for reporting. When reporting from the SGW to the PGW, the PGW sends a BEARER CONTEXT WITHIN UPDATE BEARER REQUEST to the SGW for triggering, and the SGW feedbacks a BEARER CONTEXT WITHIN UPDATE BEARER RESPONSE to the PGW for reporting.

From the above embodiments, it can be seen that the band usage information can be actively or passively reported by the eNB to the CN. Each valid period for the band usage information can be configured as required. For example, one valid period for the band usage information can be time between last two trigger events if the reporting of the band usage information is passively triggered by the CN; or time from last reporting to current reporting if the reporting of the band usage information is actively performed by the eNB; or time between two switch events between the first band and the second band.

After the band usage information arrives at the PGW, PCEF (Policy and Charging Enforcement Function), PCRF (Policy and Charging Rules Function), OFCS (OFfline Charging System) and OCS (Online Charging System) will handle the charging based on the band usage information. Various charging policies can be adopted to process the charging, for example, to discount the payment (e.g. lower price on unlicensed band), or refund data volume to users. For example, in case of OFCS (refer to 3GPP TS 32.240: Telecommunication management; Charging management; Charging architecture and principles), band usage report (band usage information) is indicated from Rf, then OFCS generates the charging of data volume of each bearer based on corresponding band usage report. In case of OCS (TS 32.240), band usage report is indicated from R0 and/or Gy. OCS reserves or blocks a certain amount of (monetary or non-monetary) units as using licensed band on the subscriber's account, and permission to use an amount of resources that matches the unit reservation is returned to the network. After transmission, the actual amount of resource usage (i.e. the used units for licensed band and unlicensed band respectively) is deduced from the band usage report to the OCS so that eventually over-reserved amounts can be re-credited to the subscriber account. For example, for a pre-pay user, units in the licensed band are firstly reserved or blocked, then over-reserved units are returned to the user's account based on the band usage information; and for a post-pay user, a bill will be generated based on the band usage information.

It is noted that the above mentioned protocols whose details are omitted in the above description can refer to related specifications such as TS 36.413, TS 32.240, and so on.

Figure 11:
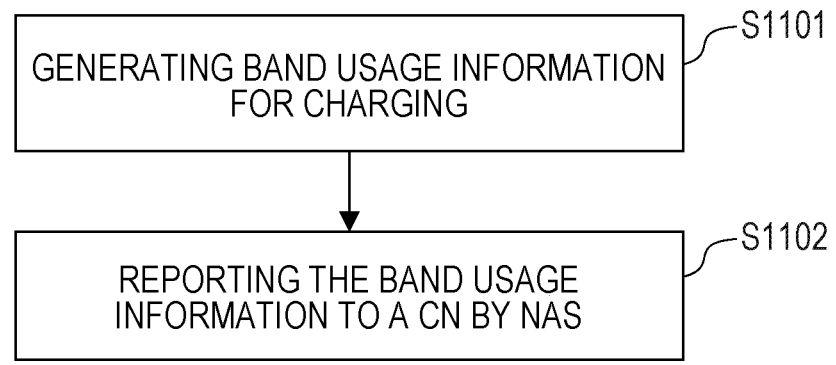
FIG. 11 illustrates a flowchart of a band usage information generating and reporting method for wireless communication performed by a UE according to an embodiment of the present disclosure.

Further, as mentioned in the above, the band usage information can also be generated at the UE. In this regard, the present disclosure also provides a band usage information generating and reporting method 1100 for wireless communication performed by a UE, as shown in FIG. 11. The method 1100 comprises: a band usage information generating step 1101 of generating band usage information for charging; and a band usage information reporting step 1102 of reporting the band usage information to a core network (CN) by Non-Access Stratum (NAS), wherein the band usage information involves band usage of at least a first band and a second band, and traffic is assigned to respective bands by an eNB to which the UE is attached. It is noted that the band usage information generating procedures at the eNB described in the above can also be applied to the band usage information generating step 1101 unless the context indicates otherwise.

In addition, an eNB, a CN, a MME and a UE for performing the above described methods are also proposed in the present disclosure. It is noted that the above descriptions for the methods can also be applied to the eNB, CN, MME and UE provided herein.

Figure 12:
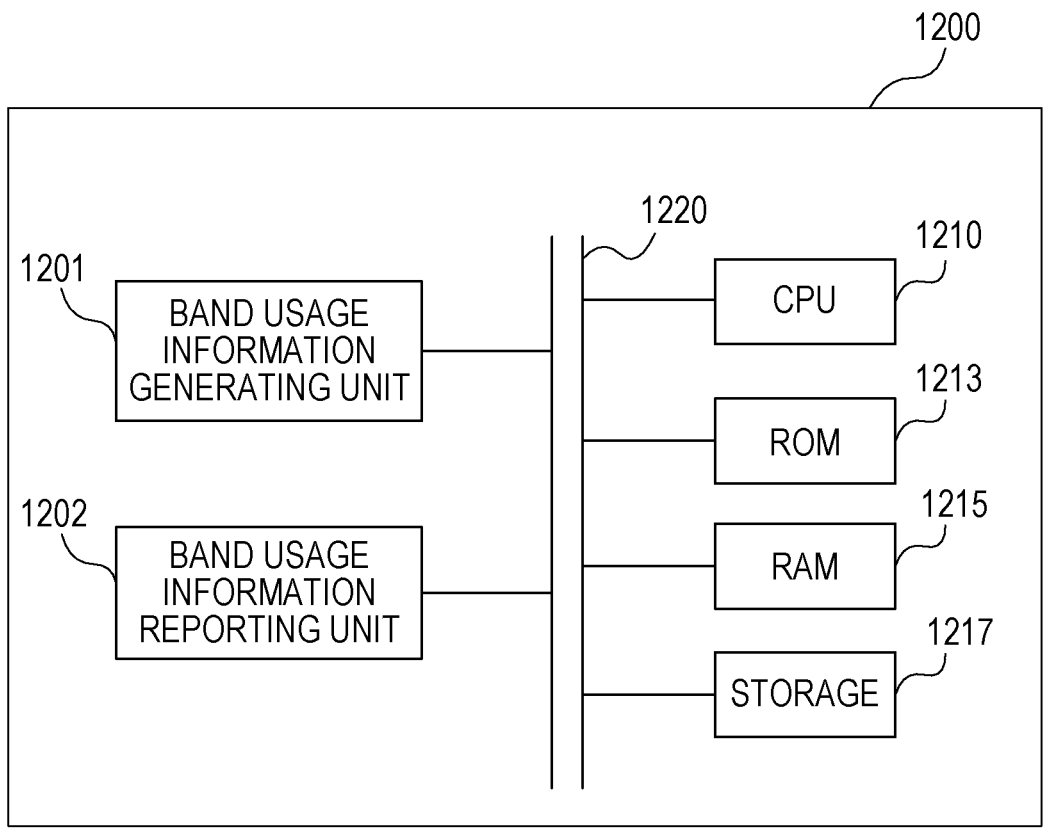
FIG. 12 illustrates a schematic block diagram of an eNB for generating and reporting band usage information according to an embodiment of the present disclosure.

FIG. 12 is a block diagram illustrating an eNB 1200 for generating and reporting band usage information for wireless communication according to an embodiment of the present disclosure. The eNB 1200 comprises: a band usage information generating unit 1201 configured to generate band usage information for charging; and a band usage information reporting unit 1202 configured to report the band usage information to a core network (CN), wherein the band usage information involves band usage of at least a first band and a second band, and traffic is assigned to respective bands by the eNB.

The eNB 1200 according to the present disclosure may optionally include a CPU (Central Processing Unit) 1210 for executing related programs to process various data and control operations of respective units in the eNB 1200, a ROM (Read Only Memory) 1213 for storing various programs required for performing various process and control by the CPU 1210, a RAM (Random Access Memory) 1215 for storing intermediate data temporarily produced in the procedure of process and control by the CPU 1210, and/or a storage unit 1217 for storing various programs, data and so on. The above band usage information generating unit 1201, band usage information reporting unit 1202, CPU 1210, ROM 1213, RAM 1215 and/or storage unit 1217 etc. may be interconnected via data and/or command bus 1220 and transfer signals between one another.

Respective units as described above do not limit the scope of the present disclosure. According to one implementation of the disclosure, the functions of the above band usage information generating unit 1201 and band usage information reporting unit 1202 may be implemented by hardware, and the above CPU 1210, ROM 1213, RAM 1215 and/or storage unit 1217 may not be necessary. Alternatively, the functions of the above band usage information generating unit 1201 and band usage information reporting unit 1202 may also be implemented by functional software in combination with the above CPU 1210, ROM 1213, RAM 1215 and/or storage unit 1217 etc.

The present disclosure also provides a mobility management entity (MME) for communicating band usage information for wireless communication, comprising: a band usage information receiving unit that receives band usage information for charging from an eNB; and a band usage information reporting unit that reports the band usage information to a PGW via a SGW, wherein the band usage information involves band usage of at least a first band and a second band, and traffic is assigned to respective bands by the eNB. An exemplary block diagram of the MME can be similar to FIG. 12 except that the above band usage information generating unit and band usage information reporting unit are replaced by the band usage information receiving unit and the band usage information reporting unit. The above description related to FIG. 12 is also applied herein.

The present disclosure also provides a user equipment (UE) for generating and reporting band usage information for wireless communication, comprising: a band usage information generating unit that generates band usage information for charging; and a band usage information reporting unit that reports the band usage information to a core network (CN) by Non-Access Stratum (NAS), wherein the band usage information involves band usage of at least a first band and a second band, and traffic is assigned to respective bands by an eNB to which the UE is attached. An exemplary block diagram of the UE can be similar to FIG. 12, and the above description related to FIG. 12 is also applied herein.

In addition, the present disclosure also provides a core network (CN) for processing charging for wireless communication, comprising: a band usage information obtaining unit configured to obtain band usage information for charging from an eNB; and a charging processing unit configured to process the charging based on the band usage information, wherein the band usage information involves band usage of at least a first band and a second band, and traffic is assigned to respective bands by the eNB. It is noted that the band usage information obtaining unit and the charging processing unit can be any different elements or the same element(s) in the CN. For example, the band usage information obtaining unit can be a MME, or the combination of a MME, a SGW and a PGW. The charging processing unit can be a charging system or any other one or more elements with this function in the CN. In other words, the band usage information obtaining unit and the charging processing unit are not limited by its implementation forms. In particular, the present disclosure can provide a CN comprising at least a MME, a SGW and a PGW as illustrated in FIG. 2. The definitions of the MME, the SGW and the PGW can refer to the above descriptions concerning the charging method performed by the CN.

The present disclosure can be realized by software, hardware, or software in cooperation with hardware. Each functional block used in the description of each embodiment described above can be realized by an LSI as an integrated circuit. They may be individually formed as chips, or one chip may be formed so as to include a part or all of the functional blocks. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used. Further, the calculation of each functional block can be performed by using calculating means, for example, including a DSP or a CPU, and the processing step of each function may be recorded on a recording medium as a program for execution. Furthermore, when a technology for implementing an integrated circuit that substitutes the LSI appears in accordance with the advancement of the semiconductor technology or other derivative technologies, it is apparent that the functional block may be integrated by using such technologies.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the present disclosure, the constituent elements of the above-described embodiments may be arbitrarily combined.

The invention claimed is:

1. An integrated circuit configured to control a process of a base station, wherein the process includes:
   generating band usage information for charging, wherein the band usage information relates to band usage of at least a first band and a second band, the first band is a licensed band and the second band is an unlicensed band both supported by the base station, traffic is assigned to respective bands by the base station, and the band usage information of the second band is provided on a per bearer basis and per time interval, wherein the time interval is configured as time between two events passively triggered by a management entity or configured as time from last reporting to current reporting actively performed by the base station; and
   transmitting a band usage information report of the band usage information to a core network entity,
   wherein, at a Packet Data Convergence Protocol (PDCP) layer, band usage of all or successfully received PDCP service data units (SDUs) is counted for the first band and the second band, respectively, to generate the band usage information, and
   wherein, in transparent mode radio link control (RLC):
   at a medium access control (MAC) layer, band usage state of each RLC protocol data unit (PDU) is reported to the PDCP layer; and
   at the PDCP layer, the band usage of all or successfully received PDCP SDUs is counted based on the band usage state of corresponding RLC PDUs to generate the band usage information.

2. The integrated circuit according to claim 1, wherein the band usage information of the second band is generated using Internet Protocol (IP) layer packets and without using Packet Data Convergence Protocol (PDCP) headers.

3. The integrated circuit according to claim 1, wherein the transmitting includes transmitting the band usage information report to a packet data network gateway (PGW) via a mobility management entity (MME) and a serving gateway (SGW).

4. The integrated circuit according to claim 3, wherein the transmitting includes transmitting the band usage information report to the MME by S1-AP interface, wherein an initial setup is performed by adding a new information element (IE) in an INITIAL CONTEXT SETUP REQUEST from the MME.

5. The integrated circuit according to claim 3, wherein the transmitting includes transmitting the band usage information report to the MME by S1-AP interface, wherein an initial setup is performed by adding a new information element (IE) in an E-RAB SETUP REQUEST from the MME.

6. The integrated circuit according to claim 1, comprising:
circuitry configured to execute the process; and
an output node, which is coupled to the circuitry and which, in operation, outputs data.

7. An integrated circuit configured to control a base station, comprising:
circuitry, which, in operation, generates band usage information for charging, wherein the band usage information relates to band usage of at least a first band and a second band, the first band is a licensed band and the second band is an unlicensed band both supported by the base station, traffic is assigned to respective bands by the base station, and the band usage information of the second band is provided on a per bearer basis and per time interval, wherein the time interval is configured as time between two events passively triggered by a management entity or configured as time from last reporting to current reporting actively performed by the base station; and
transmission circuitry, which, in operation, controls transmitting a band usage information report of the band usage information to a core network entity,
wherein, at a Packet Data Convergence Protocol (PDCP) layer, band usage of all or successfully received PDCP service data units (SDUs) is counted for the first band and the second band, respectively, to generate the band usage information, and
wherein, in transparent mode radio link control (RLC):
at a medium access control (MAC) layer, band usage state of each RLC protocol data unit (PDU) is reported to the PDCP layer; and
at the PDCP layer, the band usage of all or successfully received PDCP SDUs is counted based on the band usage state of corresponding RLC PDUs to generate the band usage information.

8. The integrated circuit according to claim 7, wherein the band usage information of the second band is generated using Internet Protocol (IP) layer packets and without using Packet Data Convergence Protocol (PDCP) headers.

9. The integrated circuit according to claim 7, wherein the transmitting includes transmitting the band usage information report to a packet data network gateway (PGW) via a mobility management entity (MME) and a serving gateway (SGW).

10. The integrated circuit according to claim 9, wherein the transmitting includes transmitting the band usage information report to the MME by S1-AP interface, wherein an initial setup is performed by adding a new information element (IE) in an INITIAL CONTEXT SETUP REQUEST from the MME.

11. The integrated circuit according to claim 9, wherein the transmitting includes transmitting the band usage information report to the MME by S1-AP interface, wherein an initial setup is performed by adding a new information element (IE) in an E-RAB SETUP REQUEST from the MME.

* * * * *